United States Patent [19]

Phillips

[11] 4,072,096
[45] Feb. 7, 1978

[54] BALER GATE HYDRAULIC LOCK

[75] Inventor: Carmen S. Phillips, Memphis, Tenn.

[73] Assignee: International Harvester Company, Chicago, Ill.

[21] Appl. No.: 710,944

[22] Filed: Aug. 2, 1976

[51] Int. Cl.² .................... B30B 15/28; B30B 5/06
[52] U.S. Cl. .................................. 100/53; 100/88; 56/341; 91/445
[58] Field of Search ............ 100/88, 53; 49/324, 49/340; 91/445, 448; 56/341–343; 37/129, 126 A, 126 C, DIG. 7

[56] References Cited

U.S. PATENT DOCUMENTS

| | | | |
|---|---|---|---|
| 2,675,677 | 4/1954 | Aikman | 91/445 X |
| 2,860,607 | 11/1958 | Orloff | 91/445 |
| 2,878,784 | 3/1959 | Pilch | 91/445 X |
| 2,969,844 | 1/1961 | Hamrick | 37/DIG. 7 |
| 3,722,197 | 3/1973 | Vermeer | 100/88 X |
| 3,751,890 | 8/1973 | Gay et al. | 56/341 X |

Primary Examiner—Peter Feldman
Attorney, Agent, or Firm—Neal C. Jonnson; Floyd B. Harman

[57] ABSTRACT

A baler adapted for towing by a tractor to pick up a windrow of hay and roll the hay into a cylindrical bale of substantial size and weight. The baler includes a gate pivotable rearwardly and upwardly to permit discharge of a completed bale onto the ground behind the baler. The gate is raised and lowered through a hydraulic system powered from the tractor. The hydraulic system includes a pair of hydraulic cylinders connected to the gate to raise and lower it upon extension and retraction respectively of the cylinders. This action is controlled by a manual flow control valve accessible to the operator on the tractor. The hydraulic system further includes a manual selector valve accessible on the baler to hydraulically lock the cylinders in their extended position to thus lock the gate in its raised position when desired. Accordingly, a factor of safety is introduced in preventing accidental falling or closing of the gate should a rupture occur in the fluid lines leading from the cylinders to the tractor, or upon accidental actuation of the control valve.

4 Claims, 3 Drawing Figures

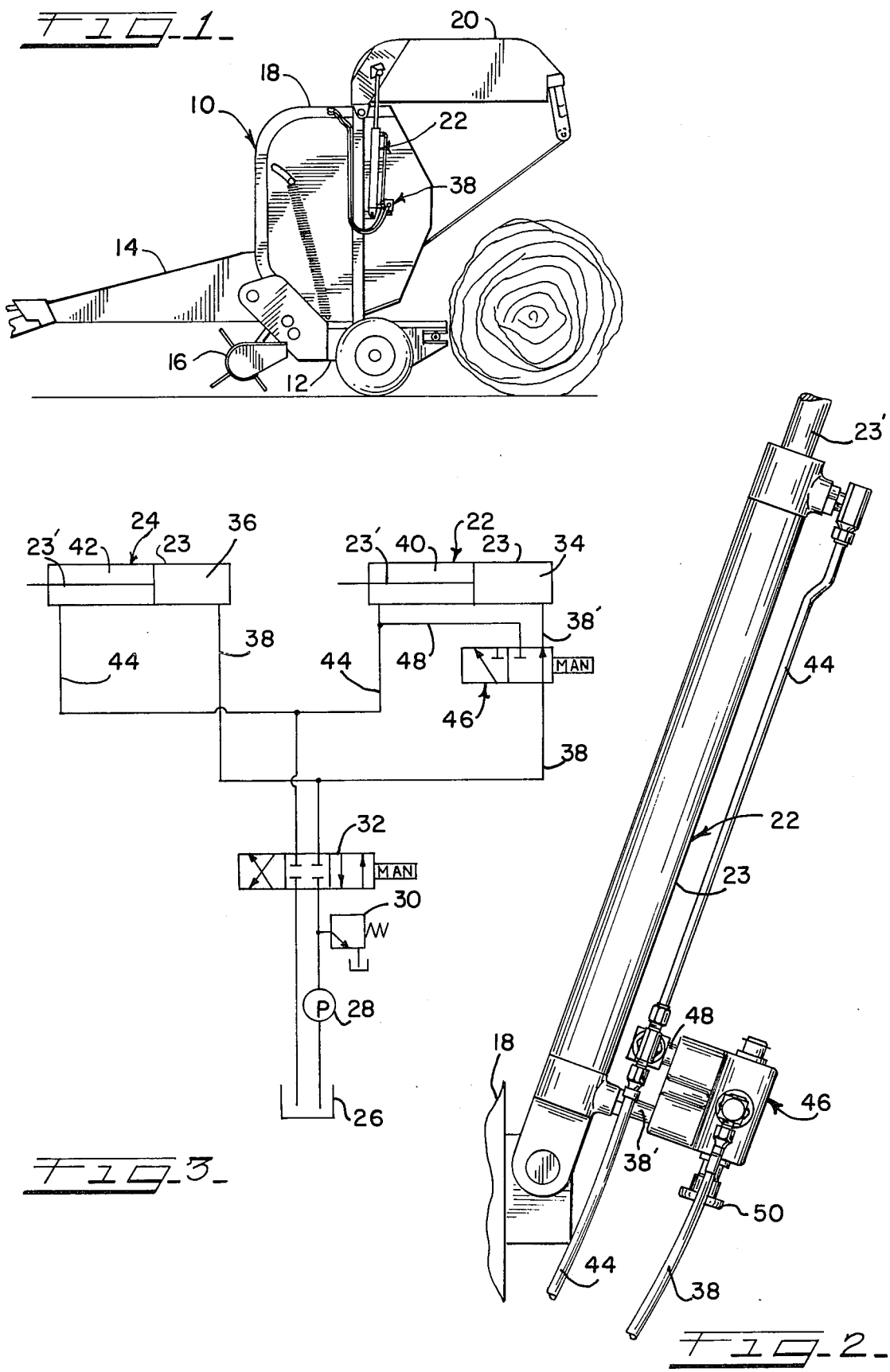

BALER GATE HYDRAULIC LOCK

BACKGROUND OF THE INVENTION

1. Field of the Invention

The invention relates generally to balers for cylindrical bales and more particularly to an improved hydraulic system for selectively locking the bale discharge gate of the baler in its raised position.

2. Prior Art

Balers for cylindrical bales commonly include a rear gate which is hydraulically raised to permit discharge of a completed bale and then lowered to a closed position for subsequent baling. While in a raised position the gate is a potential hazard for a careless operator who disregards the warnings in the operator's manual and works under the gate without securing it by a supporting member. A rupture in the hydraulic fluid lines or accidental actuation of the controls could cause the gate to move toward the closed position. In additon to the primary consideration of operator's safety, inadvertent operation of the gate against a supporting member would likely cause damage to the gate or to components of the hydraulic system.

Applicant is unaware of any prior art directed to hydraulic locking system for baler gates. Several patents were found relating to earth-working scrapers or excavators wherein U.S. Pat. Nos. 3,150,568 and 3,127,688 show condition responsive lockout valves and 3,797,140 and 3,450,418 show suspension system pressure controls. A hydraulic carrying-lock for scrapers is shown in U.S. Pat. No. 2,897,613.

SUMMARY

The invention relates to a hay baler having a bale-release gate which is selectively lockable in a raised position through means included in the hydraulic system which operates the gate. The invention provides an adjunct to the mechanical safety devices which a prudent operator should utilize in locking the gate in a raised position when necessary to work on the baler. The invention includes a selector valve manually operable to stop movement of the gate and lock it in a raised position. Moreover, the valve can be actuated to lock the gate without creating any pressure relationships which could damage the gate or components of the hydraulic system. The invention also retains the gate in its selected locked position even if the primary gate control valve is inadvertently actuated. Lastly the selector valve is disposed on the baler in a position readily accessible to the operator to enhance its consistent use thereby promoting safe operation.

BRIEF DESCRIPTION OF THE DRAWINGS

FIG. 1 is a side elevation view of a baler with its bale discharge gate in the raised position;

FIG. 2 is an enlarged side elevation view of one of the gate lift cylinders and the manual selector valve of the invention; and FIG. 3 is a schematic view of the hydraulic system of the invention.

DESCRIPTION OF THE PREFERRED EMBODIMENT

Referring first to FIG. 1 there is shown a tractor drawn baler 10 of the type adapted to form hay bales of substantial size and weight. Details of such a baler may be seen in U.S. Pat. Nos. 3,897,841 and 3,895,573. As shown in general in FIG. 1 the baler 10 includes a wheeled frame 12, a draft tongue assembly 14, a hay pickup 16, a superstructure 18, and a gate 20 pivotably mounted on the superstucture 18.

The gate 20 is movable from a closed position to the bale-release position shown in FIG. 1 through a hydraulic system including a pair of double-acting hydraulic piston-cylinder units 22 and 24 operably connected between the superstructure 18 and the gate 20 on respective opposite sides of the baler 10. Each of the units includes a cylinder portion 23 connected to superstucture 18 and a rod portion 23' connected to the gate 20.

As shown schematically in FIG. 3 the hydraulic system includes a sump 26, pump 28, pressure relief valve 30, and a three-position, four-way manual control valve 32, all disposed on the towing tractor. The units 22 and 24 are hydraulically connected in parallel for conjoint operation to raise and lower the gate 20 as determined by the position of the control valve 32. More specifically the units 22 and 24 have respective "piston sides" 34 and 36 which are interconnected by a conduit 38 (including a section 38') connected to the valve 32. Somewhat similarly the units 22 and 24 have respective "rod sides" 40 and 42 interconnected by a conduit 44 connected to the valve 32. It is thus apparent that when the valve 32 is shifted to one of its operating positions pressure fluid is directed through the conduit 38 into the piston sides 34 and 36 to thus extend the units 22 and 24 to raise the gate. Of course during this extension fluid will be forced out of the diminishing rod sides 40 and 42, into the conduit 44 and back to the sump 26 through the valve 32. Shifting the control valve 32 to the other of its operating positions reverses the above described flow and the units 22 and 24 retract in unison to lower the gate.

A feature of the invention is the provision of a three-way, two-position manual selector valve 46 shown schematically in FIG. 3 connected in the conduit 38. In practice the valve 38 is mounted on the unit 22 and is thus disposed on the side of the baler readily accessible for actuation by the operator when inspection or repairs are contemplated. As best shown in FIG. 2 the valve 46 is connected to the cylinder portion 23 by a rigid conduit section 38'. Flow is directed into the valve 46 through the above mentioned conduit 38 which in practice is a flexible hose as shown in FIG. 2. The valve 46 is hydraulically connected to the conduit 44 through a 90° fitting 48 which is shown schematically in FIG. 3. The operating element of the valve 46 is a shiftable spool 50 accessible to the operator.

When set in the position illustrated in FIG. 3 the valve 46 permits normal operation of the gate. That is, the illustrated valve setting permits fluid flow into the piston side 34 of the unit 22 so that both units 22 and 24 may be extended and retracted in response to operation of the control valve 32. When it is desired to lock the gate in a raised position the operator merely shifts the valve spool 50 to the other of its two settings. As can be visualized with reference to FIG. 3 this interrupts communication between conduit 38 and conduit 38' blocking flow to and from the piston side 34 of the unit 22. Since the weight of the open gate is supported by the fluid blocked within the piston side 34 it will be seen that the gate is hydraulically locked in its raised position. With the control valve 32 in its centered inoperative position the blocking of fluid flow by the valve 46 is a reserve safety feature in that the gate would be held even if the conduit 38 were to burst under pressure.

The interconnection of the conduits 38 and 48 provides futher advantages in that inadvertent shifting of the control valve 32 to either of its operating positions will not cause the gate to move nor will damage result to the gate or the hydraulic system. More specifically, it will be seen that pressure fluid directed into the conduit 38 will be directed through the valve 46, into the conduit 44 and thus back to sump 26. In this condition the unit 22 is, of course, locked by the valve 46 while the other unit 24 is immovable because its piston side 36 and rod side 42 are at substantially equal pressure. Should the control valve 32 be inadvertently shifted to its other position directing pressure fluid into the conduit 44, the interconnection of the conduits 48 and 38 through the valve 46 again becomes effective to direct flow back to the sump 26 with the units 22 and 24 being immovable as above described.

By the foregoing Applicant has provided a novel safety feature for a baler.

What is claimed is:

1. In a baler including a gate hydraulically raisable to release a bale, a hydraulic system for actuating and selectively locking the gate comprising:

a source of hydraulic pressure fluid;

a hydraulic cylinder on the baler operable upon actuation to raise the gate;

conduit means hydraulically interconnecting said source with said cylinder;

a flow control valve in said conduit means manually operable to direct pressure fluid into said system to selectively raise the gate;

and a manual selector valve in said conduit means interposed between said cylinder and said control valve operable to block actuating fluid flow to and from said cylinder, whereby said gate may be hydraulically locked in a raised position, said selector valve including means for permitting pressure fluid to flow therethrough back to said source when disposed in said flow-blocking relation, whereby inadvertent operation of said control valve will not cause the gate to move from its locked position.

2. In a baler adapted to be towed and powered by a tractor, said baler having a gate hydraulically raisable to release a bale from the baler, an improved system for actuating and selectively locking the gate comprising:

a source of hydraulic pressure fluid;

a hydraulic cylinder on the baler operable upon actuation to raise the gate;

conduit means interconnecting said source with said cylinder;

a flow control valve in said conduit means accessible on the tractor for selectively directing pressure fluid into said cylinder to raise said gate;

and a selector valve in said conduit means interposed between said control valve and said cylinder and accessible on the baler for manual actuation to block actuating fluid flow to and from said cylinder, whereby said gate is hydraulically lockable in a raised position, said selector valve including means for permitting pressure fluid to flow therethrough back to said source when disposed in said flow-blocking relation, whereby inadvertent operation of said control valve will not cause the gate to move from its locked position.

3. In a baler including a gate hydraulically raisable to release a bale, a hydraulic system for actuating and selectively locking the gate comprising:

a source of hydraulic pressure fluid;

a pair of hydraulic cylinders on the baler each including a rod side and a piston side arranged to raise the gate upon pressurization of the piston sides and to lower the gate upon pressurization of the rod sides;

conduit means interconnecting said source with said cylinders in hydraulically parallel relation;

a flow control valve in said conduit means manually operable to selectively direct pressure fluid into the respective piston and rod sides of said cylinders to raise and lower the gate;

and a manual selector valve in said conduit means interposed between said control valve and said cylinders operable to block fluid flow to and from the piston side of one said cylinders, said selector valve including means for hydraulically interconnecting the piston and rod sides of the other of said cylinders, whereby said gate is hydraulically lockable in a raised position.

4. In a baler including a gate hydraulically raisable to release a bale, a hydraulic system for actuating and selectively locking the gate comprising:

a source of hydraulic pressure fluid;

a hydraulic cylinder on the baler operable upon actuation to raise the gate;

conduit means hydraulically interconnecting said source with said cylinder;

a control valve actuatable to direct pressure fluid into said cylinder to selectively open or close the gate;

and a selector valve operable to block fluid flow to and from the cylinder to lock the gate while simultaneously permitting flow therethrough back to the source in the event the control valve is actuated.

* * * * *